(12) United States Patent
Alon et al.

(10) Patent No.: US 6,430,125 B1
(45) Date of Patent: *Aug. 6, 2002

(54) METHODS AND APPARATUS FOR DETECTING AND CORRECTING MAGNIFICATION ERROR IN A MULTI-BEAM OPTICAL DISK DRIVE

(75) Inventors: Amir Alon, Sunnyvale, CA (US); Jacob Finkelstein, Kafar Saba (IL)

(73) Assignee: Zen Research (Ireland), Ltd., Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 09/037,471

(22) Filed: Mar. 10, 1998

Related U.S. Application Data

(63) Continuation-in-part of application No. 08/675,526, filed on Jul. 3, 1996, now Pat. No. 5,729,512.

(51) Int. Cl.$^7$ ............................................. G11B 7/095
(52) U.S. Cl. ............................... 369/44.32; 369/44.37
(58) Field of Search ............................ 369/44.23, 54, 369/58, 47.37, 44.32

(56) References Cited

U.S. PATENT DOCUMENTS

| | | | |
|---|---|---|---|
| 4,272,651 A | 6/1981 | Yoshida et al. | 369/112 |
| 4,459,690 A | 7/1984 | Corsover et al. | 369/44 |
| 4,536,866 A | 8/1985 | Jerome et al. | 369/112 |
| 4,578,786 A * | 3/1986 | McIntosh et al. | 369/44 |
| 4,768,184 A * | 8/1988 | Reno | 369/112 |
| 4,875,076 A | 10/1989 | Torigoe et al. | 355/53 |
| 4,953,152 A * | 8/1990 | Ito et al. | 369/44.39 |
| 4,969,137 A | 11/1990 | Sugiyama et al. | 369/32 |
| 5,144,616 A * | 9/1992 | Yasukawa et al. | 369/112 |
| 5,283,778 A | 2/1994 | Maeda | 369/112 |
| 5,309,205 A | 5/1994 | Hayano | 355/243 |
| 5,479,387 A * | 12/1995 | Ando et al. | 369/44.37 |
| 5,483,511 A | 1/1996 | Jewell et al. | 369/44.37 |
| 5,493,553 A | 2/1996 | Maurice | 369/109 |
| 5,526,182 A * | 6/1996 | Jewell et al. | 359/621 |
| 5,573,492 A | 11/1996 | Dianna et al. | 600/117 |
| 5,594,711 A | 1/1997 | Koyama | 369/44.37 |
| 5,602,383 A | 2/1997 | Takekoshi et al. | 250/201.5 |
| 5,729,512 A * | 3/1998 | Alon | 369/44.32 |
| 5,808,983 A * | 9/1998 | Tsutsui et al. | 369/44.25 |

(List continued on next page.)

FOREIGN PATENT DOCUMENTS

| | | | |
|---|---|---|---|
| DE | 25 43 276 | 3/1977 | G11B/7/00 |
| DE | 3804701 A1 | 9/1998 | G11B/7/095 |
| EP | 0 441 435 A1 | 8/1991 | G11B/7/14 |
| EP | 0 545 526 A1 | 6/1993 | G11B/7/00 |
| JP | 02158931 | 6/1990 | G11B/7/14 |
| JP | 06096467 | 4/1994 | G11B/7/14 |
| WO | WO 93/03481 | 2/1993 | G11B/7/135 |
| WO | WO 94/19796 | 9/1994 | G11B/7/00 |

OTHER PUBLICATIONS

Smith, W.J., "Anamorphic Systems," *Modern Optical Engineering*, Jan. 1, 1966, pp. 239–241.

Smith, W.J., "Variable Power (Zoom) Systems," *Modern Optical Engineering*, Jan. 1, 1966, pp. 241–245.

*Primary Examiner*—Aristotelis Psitos
(74) *Attorney, Agent, or Firm*—Fish & Neave; Nicola A. Pisano; Michael J. DeHaemer, Jr.

(57) ABSTRACT

Methods and apparatus are provided for detecting and correcting magnification errors while simultaneously reading or writing multiple data tracks with a multi-beam optical disk drive. An optical head for the optical disk drive includes a plurality of laser diodes that generate multiple light beams for reading from or writing to the optical disk, means for detecting a magnification error, and means for compensating for the magnification error to align the multiple light beams with multiple data tracks. A number of opto-mechanical systems are provided for correcting the magnification errors in the beams.

30 Claims, 7 Drawing Sheets

U.S. PATENT DOCUMENTS 5,808,986 A * 9/1998 Jewell et al. ............ 369/44.37
5,815,473 A * 9/1998 Takahashi et al. ....... 369/44.37
5,854,780 A * 12/1998 Opheij et al. ............ 369/44.37
5,909,418 A * 6/1999 Noda et al. ............... 369/44.37
5,923,632 A * 7/1999 Kato et al. ................ 369/44.37
5,959,953 A * 9/1999 Alon ........................ 369/44.41

* cited by examiner

| Lookup Table | |
|---|---|
| Track Position 1 | Magnification Error |
| Track Position 2 | Magnification Error |
| Track Position 3 | Magnification Error |
| Track Position 4 | Magnification Error |

*FIG. 11*

METHODS AND APPARATUS FOR DETECTING AND CORRECTING MAGNIFICATION ERROR IN A MULTI-BEAM OPTICAL DISK DRIVE

RELATED APPLICATIONS

The present application is a continuation-in-part of U.S. patent application Ser. No. 08/675,526, filed Jul. 3, 1996, now U.S. Pat. No. 5,729,512, issued Mar. 17, 1998.

FIELD OF THE INVENTION

The present invention relates to optical disk drives that use multiple beams to simultaneously read or write multiple tracks of an optical disk. More specifically, the present invention provides a multi-beam optical system that detects and corrects for magnification errors and variations in track pitch while simultaneously reading or writing multiple tracks of an optical disk.

BACKGROUND OF THE INVENTION

Due to their high storage density, long data retention life, and relatively low cost, optical disks are becoming increasingly popular as a means to distribute information. Large format disks have been developed for storing full length motion pictures. The compact disk (CD) format was developed and marketed for the distribution of musical recordings and has replaced vinyl records. High-capacity, read-only data storage media, such as CD-ROM and Digital Versatile Disk (DVD), have become prevalent in the personal computer field, and the DVD format may soon replace videotape as the distribution medium of choice for video information.

Recently, relatively inexpensive optical disk writers and writable optical media have become available, making optical disks popular as backup and archival storage devices for personal computers. The large storage capacity of writable optical disks also makes them ideal for use in multimedia authoring and in other applications which require access to large amounts of storage. Current writable optical disk technologies include several write-once technologies, such as CD-Recordable (CD-R). A few technologies permit writing, erasing, and rewriting data on a disk, such as Mini-Disk (MD), which uses magneto-optical technology. Other writable formats employ phase-change and dye-polymer technology. Recent advances in writable optical disk technology have made rewritable optical media more practical, and the specification for DVD-RAM calls for use of high-capacity rewritable optical media.

An optical disk is made of a transparent disk or substrate in which data, in the form of a serial bit-stream, is encoded as a series of pits in a reflective surface within the disk. The pits are arranged along a spiral or circular track. Data is read from the optical disk by focusing a low power laser beam onto a track on the disk and detecting the light reflected from the surface of the disk. By rotating the optical disk, the light reflected from the surface of the disk is modulated by the pattern of the pits rotating into and out of the laser's field of illumination. Optical and imaging systems detect the modulated, reflected, laser light and produce an electrical signal which may be decoded to recover the digital data stored on the optical disk.

Data is typically recorded on writable optical disks by using a higher power laser than is used for reading. The media for use with optical disk writers typically includes a recording layer, made of a material that changes its optical characteristics in response to the presence of the beam from the high power laser. The high power laser is used to create "pits" in the recording layer which have a different reflectivity than surrounding areas of the disk, and which can be read using a lower power reading beam. In systems having the ability to erase and re-record data, a laser having a power output between the low power used for reading and the high power used for writing may be used to erase data. Alternatively, some systems employ a laser which outputs a different wavelength of light to erase data from the optical media. The methods used to write and erase optical disks depend on the type of recordable media being used.

To be able to write or retrieve data from an optical disk, the optical systems include an optical head which may be positioned to read or write data on any disk track. Processor-driven servo mechanisms are provided for focusing the optical system and for keeping the optical head positioned over the track, despite disk warpage or eccentricity.

Because in most previously known systems the data is read or written serially, i.e. one bit at a time, the maximum data transfer rate for an optical disk reader or writer is typically determined by the rate at which the pits on the disk (or the correct positions for pits to be written) pass by the optical head. The linear density of the bits and the track pitch (distance between tracks) are fixed by the specification of the particular optical disk format. For example, CD disks employ a track pitch of 1.5 $\mu$m ($\pm$0.1 $\mu$m), while DVD employs a track pitch only about one-half as wide.

Previously known methods of increasing the data transfer rate of optical disk readers and writers have focused on increasing the rate at which the pits pass by the optical head by increasing the rotational speed of the disk itself. Currently, drives with rotational speeds of up to 16x standard speed are commercially available, and even faster reading speeds have been achieved by moving to constant angular velocity designs. Higher disk rotational speeds, however, place increased demands on the optical and mechanical subsystems within the optical disk player, create greater vibration, and may make such players more difficult and expensive to design and manufacture. Higher rotation speeds also make accurately writing data to a disk more difficult, so few CD-R systems are available that record at faster than 4x standard speed.

A cost effective alternative to increasing the disk rotational speed to provide faster optical disk drives is to read or write multiple data tracks simultaneously. If, for example, seven tracks could be read or written simultaneously, an optical disk drive which rotates the disk at 8x standard speed would provide performance equivalent to a 56x optical disk drive.

Similar techniques have been employed to provide high-speed optical disk readers. Numerous methods for generating multiple beams to read several tracks simultaneously have been used. U.S. Pat. No. 4,459,690, to Corsover, for example uses acousto-optical techniques to split a beam into multiple beams for use in reading an optical disk. Other systems have used a diffraction grating to generate multiple beams used to simultaneously illuminate multiple tracks. The system described in commonly assigned U.S. Pat. No. 5,426,623, to Alon et al., uses a wide area illumination beam, which illuminates multiple tracks at once to simultaneously read multiple tracks of an optical disk.

It should be noted that as used herein, a data track is a portion of the spiral data track of a typical optical disk, and follows the spiral for one rotation of the disk. Thus, a drive capable of reading multiple data tracks simultaneously will read multiple portions of the spiral data track at once. For optical disks having concentric circular tracks, a data track would refer to one such circular track. For disks having multiple concentric spiral tracks, such as those described in commonly assigned, copending U.S. patent application Ser. No. 08/885,425, filed Jun. 30, 1997, a data track would refer to one of the concentric spiral tracks.

Designing an optical disk drive that simultaneously writes multiple tracks of an optical disk presents slightly different challenges than designing a system which only reads multiple tracks simultaneously. First, each of the beams used to write to the disk must be able to be separately modulated, to record different data on each of the tracks. Consequently, designs like those described above, that split a single beam or employ a wide area beam, will not generally work for a drive that can both read and write. Instead, multi-beam optical disk drives which can write multiple tracks simultaneously use multiple laser diodes, which can be individually modulated, to generate the beams used for writing. Such an array of laser diodes is described, for example, in U.S. Pat. No. 5,144,616 to Yasukawa et al.

Additionally, since most optical disk formats arrange their data along a single long spiral, there may be difficulties with data alignment and timing when writing multiple tracks simultaneously. Insuring alignment of the data being written by multiple beams on different parts of the same spiral may be very difficult. These problems are overcome in some writable formats by using a pre-formatted disk, on which the tracks are already laid out, and the disk already contains clocking and timecode information before data is written to the disk. CD-Recordable (CD-R), which is currently the most popular writable optical disk format uses such a scheme, as do DVD-R and DVD-RAM, which will probably replace CD-R over the next few years. Other formats may include header information that describes the track pitch.

Although using a format such as CD-R, DVD-R, or DVD-RAM, in which the tracks are pre-formatted, solves the most difficult data alignment and timing problems faced by a multi-beam optical disk drive, it creates a new problem with keeping the beams aligned with the tracks while writing. Specifically, since the tracks are pre-arranged on the disk, it is necessary to insure that each of the multiple beams aligns with one of the tracks during writing. This same alignment of the beams with the tracks also must be maintained while reading from the disk.

Manufacturing tolerances may lead to minor differences in magnification of an optical head, leading to minor differences in the spacing of the beams between systems. Additionally, there is some variation in the track pitch allowed in the specifications for commonly used optical disk formats, such as CD-ROM, CD-R, DVD, DVD-R and DVD-RAM formats. A multi-beam optical disk drive must be able to detect and correct for these magnification errors and track pitch variations to insure that the beams used to read from and write to the disk are properly aligned with the tracks.

It would therefore be desirable to provide a multi-beam optical head, and methods of use, that enable detection and correction of magnification and track-pitch errors while simultaneously reading or writing multiple tracks of data from or to an optical disk. The capability to correct for such errors would provide improved alignment of the beams with the tracks being read or written on the disk, and make simultaneous reading or writing of multiple tracks practicable.

It further would be desirable to provide a multi-beam optical head, and methods of use, that enable detection of a track pitch of an optical disk, and that employ the detected track pitch to correct magnification and track-pitch errors while simultaneously reading or writing multiple tracks of an optical disk.

SUMMARY OF THE INVENTION

In view of the foregoing, it is an object of the present invention to provide methods and apparatus for detecting and correcting misalignments between the beams of a multi-beam optical disk drive and the tracks of an optical disk caused by magnification error and track-pitch variation.

It is a further object of this invention to provide methods and apparatus that enable detection of a track pitch of an optical disk, and that employ the detected track pitch to correct magnification and track-pitch errors while simultaneously reading or writing multiple tracks of an optical disk.

In accordance with the principles of the present invention, this is accomplished by detecting a magnification error, and then using that information to vary the optical power or magnification of the optical system. Accordingly, the reading or writing beams of the system may be focused onto the disk to adjust the spacing between the beams, so they are aligned with the tracks on the optical disk. A number of methods and apparatus employing the principles of the present invention are provided.

A first embodiment of a magnification correction system built in accordance with the principles of the present invention uses a movable lens arrangement to adjust the magnification of the system. An alternative embodiment uses one or more prisms to build an anamorphic variable power optical system that adjusts the spacing of the beams by rotating a prism. Another alternative embodiment uses a lens with a curvature that varies along its length to correct magnification errors. In certain embodiments, the optical head may be moved laterally with respect to the tracks to compensate for the magnification and track pitch variation effects.

Magnification errors may also be corrected by changing the effective distance between the laser diodes and, optionaly, or the spacing between photodetectors used to image the multiple data tracks. This is done by adjusting the position of the array of laser diodes and photodetector elements, relative to the radial direction of the optical disk, so that the beams align with the tracks of the optical disk.

Methods are also described for detecting magnification and track pitch errors, so that those errors may be taken into account when simultaneously reading or writing several tracks of an optical disk. In one embodiment, the track pitch is determined using track pitch information recorded on the disk; in other embodiments, an initial calibration step may be employed wherein the track pitch is computed by a track counting method or by analyzing the jitter rate obtained in reading block header (or other pre-recorded) data from the disk.

Any of the foregoing methods may be used to provide continuous correction of magnification errors, thereby enabling the beams of a multi-beam optical disk drive to remain aligned with the tracks of an optical disk.

BRIEF DESCRIPTION OF THE DRAWINGS

The above and other objects of the invention, its nature and various advantages, will be apparent upon consideration of the following detailed description, taken in conjunction with the accompanying drawings, in which like reference characters refer to like parts throughout, and in which:

FIG. 11 shows an illustrative lookup table of magnification error correlated to track position.

DETAILED DESCRIPTION OF THE INVENTION

Figure 1:
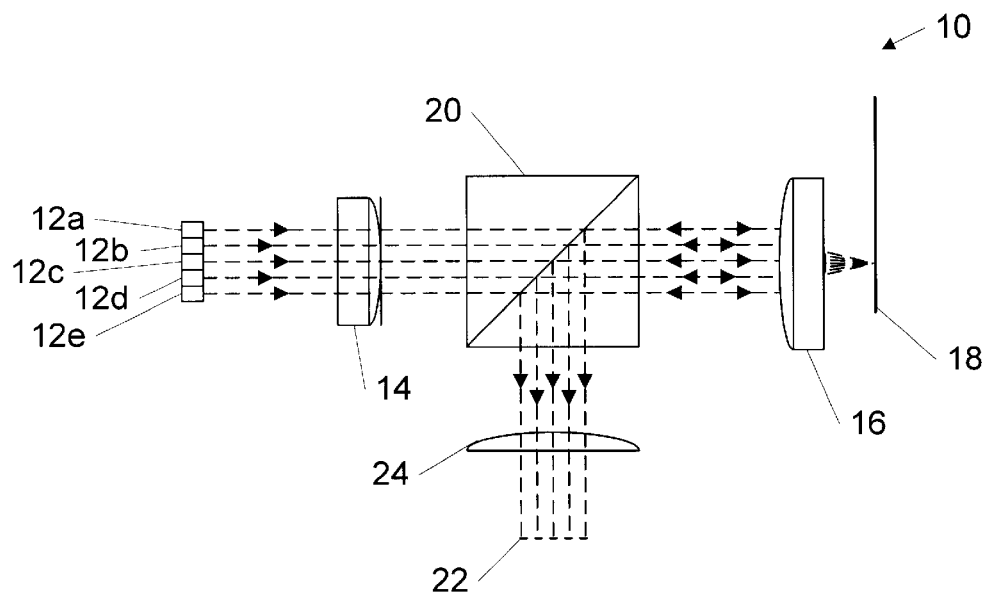
FIG. 1 is a simplified view of an optical head for use in a multi-beam optical disk drive.

Referring first to FIG. 1, a simplified diagram of an optical head 10 for a multi-beam optical disk drive constructed in accordance with the present invention is described. Individual components of optical head 10 may comprise elements used in conventional CD-R or DVD-RAM drives. In accordance with the present invention, a plurality of laser diodes 12a–12e generate a plurality of light beams which may be used to simultaneously read multiple tracks, or individually modulated to write data on multiple tracks, of optical disk 18. The beams are collimated by collimator lens 14, and are focussed onto a surface of optical disk 18 by objective 16.

Optical disk 18 contains a data layer (not shown) in which the data is recorded, typically in the form of "pits", having a reflectivity different than the surrounding areas of optical disk 18. This difference in reflectivity is typically achieved by using a data layer comprising a layer of an organic polymer dye disposed in front of a thin reflective film (typically gold). When the system is writing data to the disk, the light beams heat the polymer dye to a predetermined temperature, causing the opacity of the dye to change, and altering the reflectivity of the data layer. Alternatively, some recordable optical disks use physical or chemical properties of the data layer material, such as its magnetic properties, or its ability to polarize incident light, to record the data.

With respect to the magnification correction aspects of the present invention for simultaneously writing multiple data tracks, optical disk 18 is preferably pre-formatted, as are most commercially available recordable optical disk types. For a preformatted optical disk 18, the block headers and tracks are already laid out on optical disk 18 and contain clocking and timecode information. To record data in the tracks, the beams used for writing must be aligned with the pre-formatted tracks. Alternatively, if the disk is not pre-formatted, then it is sufficient only to maintain the track pitch of the multiple tracks being written within the specification of the appropriate disk type. If the disk is being read, the beams used for reading must be aligned with the tracks.

Referring again to FIG. 1, the beams, whether reading or writing data, are reflected off of the data layer of optical disk 18, and are directed toward optical sensor 22 by beam splitter 20, which may be a half-silvered mirror. Lens 24 may be provided to further focus the reflected light from the surface of optical disk 18 on to optical sensor 22. Optical sensor 22 may be used to detect the focus, tracking, and magnification error of the beams which are used to write to optical disk 18. Additionally, optical sensor 22 may be used to read data from optical disk 18 when the power of the beams is lowered to permit reading.

The description of the optical head of FIG. 1 is intended to be illustrative, not limiting. It is to be understood that many variations and embellishments of the basic optical head are possible. For example, beam splitter 20 may be a holographic element or half-silvered mirror. Several possible configurations of optical heads usable for reading and writing optical disks are discussed in *The Compact Disc Handbook*, Pohlmann, K., 2d. ed., A-R Editions, 1992. The principles of the present invention are not limited to an optical head as disclosed in FIG. 1, but are easily adaptable to a wide variety of optical head designs, if modified as described hereinafter.

Figure 2A:
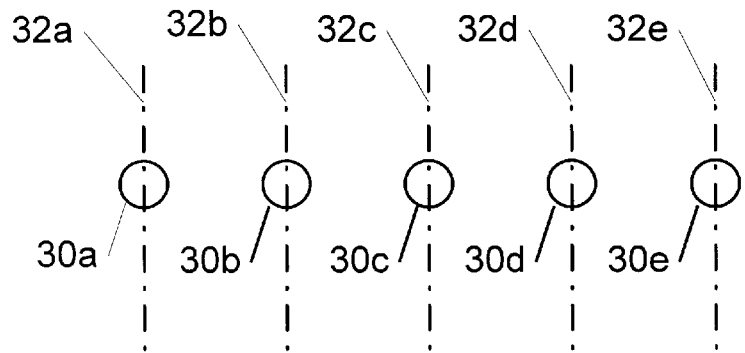
FIGS. 2A–2C illustrate alignment of the light beams generated by the laser diodes with the tracks of the optical disk when the system is in alignment, and when there are over-magnification and under-magnification errors, respectively.
Figure 2B:
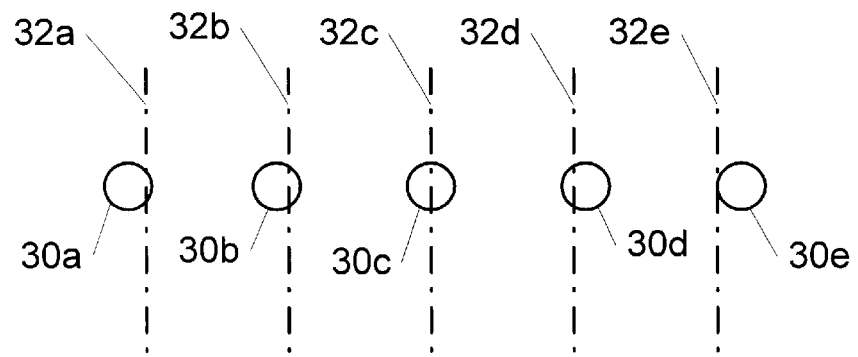
Figure 2C:
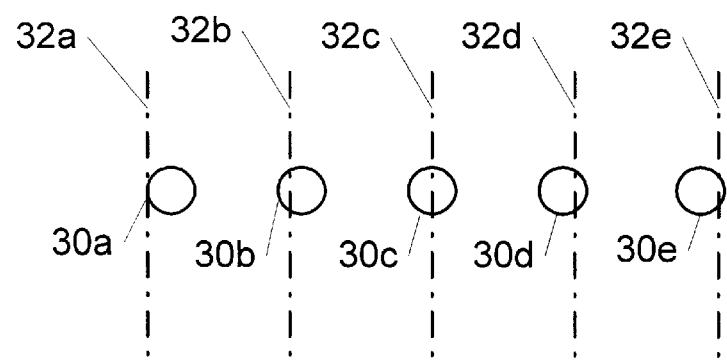

FIGS. 2A–2C show the pre-formatted tracks on optical disk 18, with the spots projected by the plurality of beams. In FIG. 2A, spots 30a–30e, projected by laser diodes 12a–12e, respectively, are aligned with pre-formatted tracks 32a–32e, respectively, so the tracks may be read or written simultaneously. Due to manufacturing tolerances, temperature changes, age, and other factors, the magnification of the optical system which focuses the beams onto the disk may vary slightly. Additionally, there may be slight variation in the track pitch of the pre-formatted tracks on recordable optical disks. These factors can cause the beam spacing not to precisely correspond to the track spacing, but instead lead to a misalignment of the beams with the tracks.

This misalignment is hereinafter referred to as "magnification error."

In FIG. 2B, the spacing between spots 30a–30e is greater than the spacing between tracks 32a–32e, so the optical system provides too much magnification.

FIG. 2C shows the situation where too little magnification is provided by the system, thereby causing the spacing of spots 30a–30e to be less than the spacing between tracks 32a–32e. Similar errors could also result from variations in the track pitch of optical disk 18. To permit simultaneous reading or writing of multiple tracks, these magnification errors must be corrected.

Figure 3:
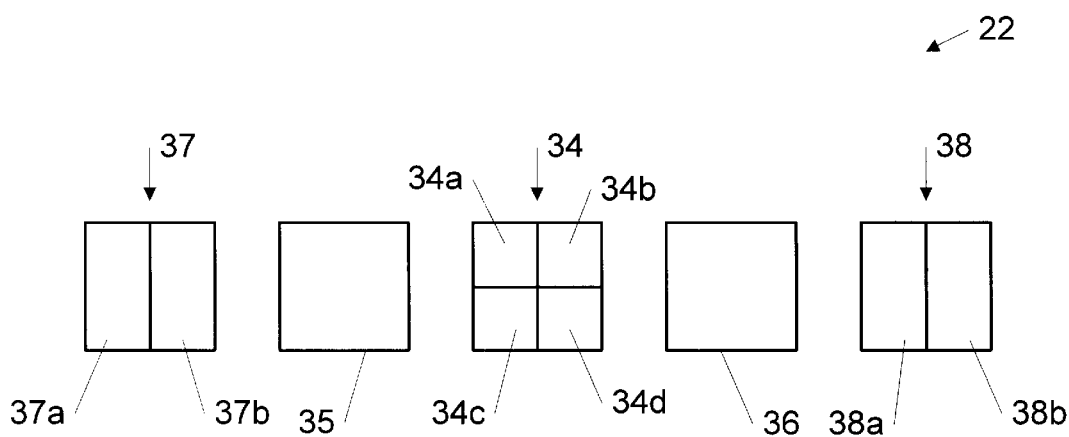
FIG. 3 shows an optical sensor used for detecting the degree of magnification error.

Before magnification errors may be corrected, however, they first must be detected. FIG. 3 shows a detailed view of optical sensor 22 of FIG. 1. Optical sensor 22 includes photodetector elements 34–38, which may be used for reading data from the tracks when the beams are set to a power level appropriate for reading. When data is being written to optical disk 18, light reflected from the pre-formatted tracks of optical disk 18 will be projected onto photodetector elements 34-38.

Photodetector elements 37 and 38, illustratively the outermost elements of the array, further comprise two segments 37a, 37b and 38a, 38b, respectively, per element. A signal proportional to the magnification error can be generated by subtracting the sum of the signals from the innermost segments of photodetector elements 37 and 38 from the sum of the signals from the outermost segments of photodetector elements 37 and 38, in accordance with equation (1):

$$E_m = (37b + 38a) - (37a + 38b) \quad (1)$$

In addition to reading data from multiple tracks, and generating a signal indicative of magnification error, the photodetector elements of optical sensor 22 may also be used to generate tracking and focus error signals. For example, photodetector element 34 may optionally be configured as a quadrant detector, for use in detecting focus errors using the well-known astigmatism method, using equation (2):

$$E_F = (34a + 34d) - (34b + 34c) \quad (2)$$

Likewise, photodetector elements 37 and 38 may be employed to compute a tracking error. In this case, the sum of the left-hand segments of photodetector elements 37 and 38 is subtracted from the sum of the right-hand segments of photodetector elements 37 and 38, in accordance with equation (3):

$$E_t = (37a + 38a) - (37b + 38b) \quad (3)$$

Alternatively, a signal indicative of the tracking error could be generated by subtracting the sum of the signals from the left-hand quadrants (34a, 34c) of photodetector 34 from the sum of the signals from the right-hand quadrants (34b, 34d) of photodetector element 34.

It will be evident to one skilled in the relevant arts that the number and configuration of the 15 photo-detector elements shown in FIG. 3 must match the number and configuration of the beams used in the multi-beam system. It will further be evident that the detectors shown with reference to FIG. 3 are illustrative. In particular, the magnification error may be computed with any of the detector elements, including the quadrants of photodetector element 34.

It is expected, however, that the magnification error may be most easily and accurately measured using the signals generated by the outermost pair of elements, where the effect of the magnification error is expected to be the largest. Moreover, either or both of the focus error signal and tracking error signal may be computed using alternative arrangements, without departing from the principle of the present invention.

Other methods may also be used to determine the track pitch, and hence the degree of magnification required to provide proper alignment of the multiple beams with the tracks being read or written. For example, some optical disks may include the track pitch information in a header area of the optical disk. This information is read when the optical disk is inserted into the disk drive, and may be used to adjust the degree of magnification provided by the optical system as described hereinbelow.

In alternative methods, a calibration step may be performed when the optical disk is first inserted in the optical disk drive. The optical disk drive is programmed to provide a magnification of the optical system that corresponds to a nominal track pitch for a preselected optical disk type. During the calibration step, the optical disk is scanned and a lookup table of magnification error is generated that is correlated to track position using, for example, track counting or jitter analysis methods.

The lookup table created during the calibration step may be continuously or periodically consulted when simultaneously reading or writing multiple tracks to the optical disk to vary the degree of magnification correction based on local track pitch. The lookup table values are generated whenever a new optical disk is inserted into the optical disk drive to account for local variations in track pitch, and may be periodically updated during the reading or writing process.

In the track counting method, the lookup table values are based on the actual track pitch measured on the optical disk, for example, as a function of radial location on the disk. In this method, optical head 10 is located at a first position, at which the block header (or previously written data) is read. Optical head 10 is then moved to a second position a known distance from the first position, and the block header information for that track is read. While the optical head is being moved between the first and second positions, the number of tracks crossed are counted. From this information, the actual track pitch of the optical disk may be computed as the known distance divided by the number of tracks skipped.

Alternatively, the track pitch may be calculated by determining the number of data blocks that fit into a known number of tracks. Since the length of a data block along the spiral track is known, the length of the spiral portion of the track between the two blocks may be determined from the difference in block numbers read from the block header data. This difference may then be compared to the difference computed for an optical disk having a nominal track pitch, to estimate the actual track pitch of the disk.

The ratio of the actual track pitch to the nominal track pitch yields the magnification error, which may then be used to adjust the optical system, as described hereinafter. Alternatively, the foregoing process may be repeated along the radius of the disk, thus generating a table of track pitch correlated to track position.

Referring now to FIG. 11, an illustrative lookup table of magnification error correlated to track position is shown. Lookup table 62 contains multiple rows, with each row having a track position and its corresponding magnification error. Track positions 1–4 (63a, 64a, 65a, 66a) have corresponding magnification errors 63b, 64b, 65b and 66b. It should be understood by one skilled in the art that lookup table 62 can contain additional rows and columns, such as columns for the actual and nominal track pitch.

In the jitter analysis method, a table of magnification corrections is generated, correlated to disk location, that provides the lowest jitter rate, i.e., the lowest error correction rate for the data signals, when reading block header data, or previously written tracks of the optical disk. In this method, block header information or other data is read from several tracks, and the degree of magnification provided by the optical system is dithered. This in turn effects the quality of the track signals for the data being read, as reflected in the error rate, for example, as determined by conventional ECC circuitry. The degree of magnification that produces the lowest error rate is then selected for use in reading data from, or writing data to, the optical disk. position and its corresponding magnification error. Track positions 1–4 (63a, 64a, 65a, 66a) have corresponding magnification errors 63b, 64b, 65b and 66b. It should be understood by one skilled in the art that lookup table 62 can contain additional rows and columns, such as columns for the actual and nominal track pitch.

Figure 4:
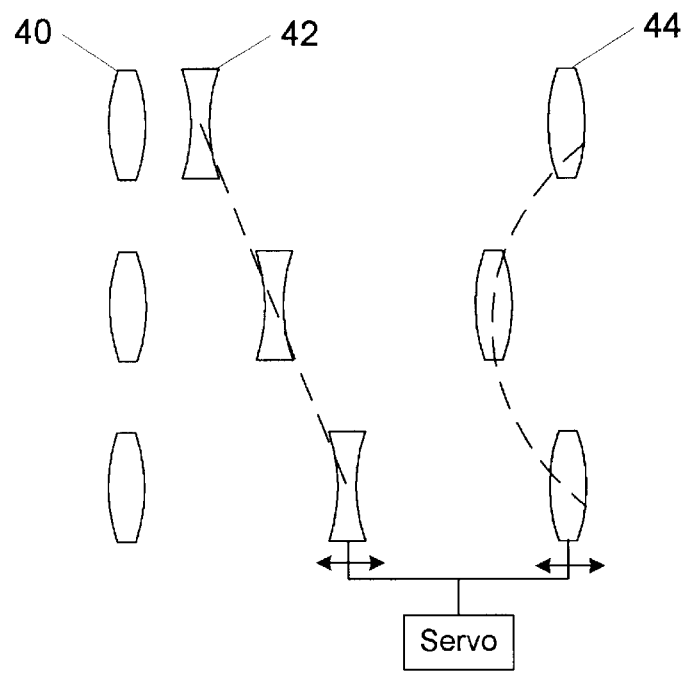
FIG. 4 shows an embodiment of a variable power optical system.
Figure 5:
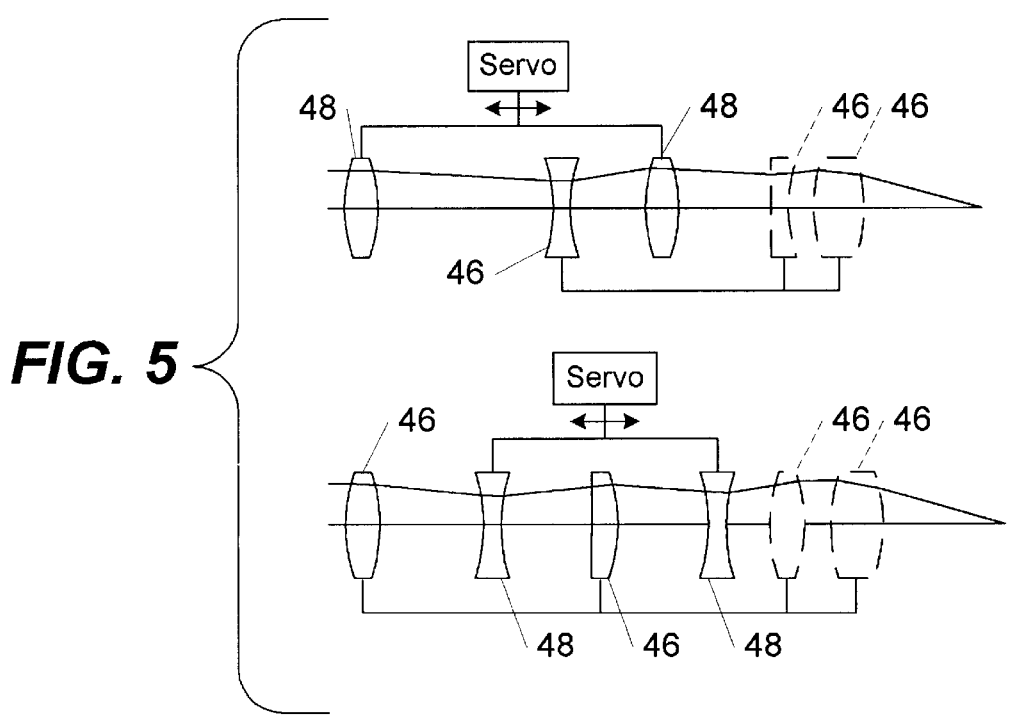
FIG. 5 shows an alternative embodiment of a variable power optical system.

Once a magnification error has been detected by any of the foregoing methods, various methods and mechanisms may be employed to correct or compensate for the error. In a first embodiment of a magnification error correction system, optical head 10 of FIG. 1 is provided with a capability to vary its optical power or magnification. Such a magnification correction mechanism, preferably disposed in the optical path between laser diodes 12a–12e and optical disk 18, and more preferably, in the optical path before collimating lens 14, would enable correction of the spacing of the beams before they are projected onto optical disk 18. FIGS. 4 and 5 show two illustrative methods of providing a variable power optical system.

In FIG. 4, lens 40 remains stationary while a servo system moves lens 42 axially to vary the power of the optical system responsive to the magnification error signal generated by optical sensor 22. Moving lens 42 causes a shift in the image plane, so lens 44 must be moved towards or away from lens 42 to counteract the image plane shift. In the system of FIG. 4, the position of lens 44 is expected to be a nonlinear function of the position of lens 42.

Referring now to FIG. 5, two alternative variable power optical systems are shown, comprising a series of alternately fixed lenses 46 and movable lenses 48. Movable lenses 48 are linked together, and move axially as a unit to vary the power of the optical system. Some shifting of the image plane occurs as the power is varied, but over small ranges of power change, the image plane shift is small. Additional lenses may be added to reduce image plane shift.

Figure 6A:
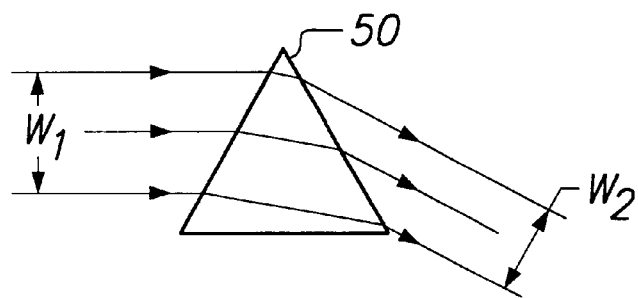
FIGS. 6A–6B illustrate the use of prisms in an anamorphic variable power optical system.
Figure 6B:
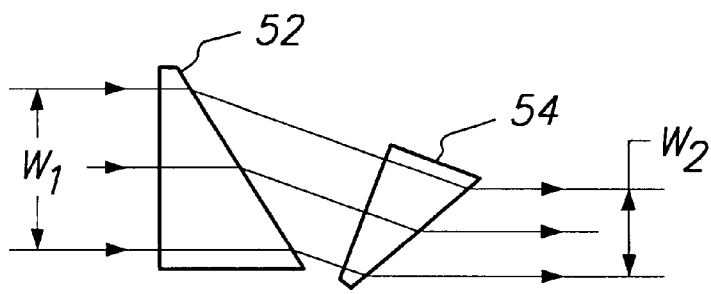

Yet another embodiment of a magnification error correction mechanism of the present invention is shown in FIGS. 6A and 6B. As shown in FIG. 6A, prism 50 may be inserted into the optical path between laser diodes 12a–12e and optical disk 18. Prism 50 may be used as an anamorphic lens, wherein the prism magnifies the beams in a single dimension. This may be used, for example, to reduce the width of the beam spacing from $w_1$ to $w_2$. Since the power of prism 50 is determined by the angle of its faces with respect to the optical path, its power may be varied by rotating prism 50 about a line parallel to its axis, thereby compensating for the magnification errors. This may be accomplished by using a servo system (not shown) to rotate prism 50 responsive to the magnification error signal produced by optical sensor 22.

However, prism 50 also causes an angular deviation of the incident light that is a function of the angle of the prism faces with respect to the light. As illustrated in FIG. 6B, a second prism may be used to eliminate or reduce the angular deviation. Thus, by suitably rotating prism 54 the angular deviation introduced by prism 52 may be counteracted. Further details and designs of variable power systems using lenses and/or prisms are described in Chapter 9 of *Modern Optical Engineering*, Warren J. Smith, McGraw-Hill Book Company, New York, 1966, which is incorporated herein by reference.

It should be noted that the light exiting prism 54 in the embodiment of FIG. 6B has a lateral offset retative to the rays entering prism 52. Relatively small offsets may be insignificant, depending upon the size of the detector elements used for imaging the multiple tracks. Larger offsets may appear as tracking errors, and may be compensated for using any of a number of well-known methods for correcting tracking errors. For example, a larger tracking error may be corrected by using optical sensor 22 to generate a tracking error signal as described hereinabove with respect to FIG. 3. Optical head 10 may then be moved by a servo system (not shown) responsive to the tracking error signal to compensate for the tracking error.

Figure 7:
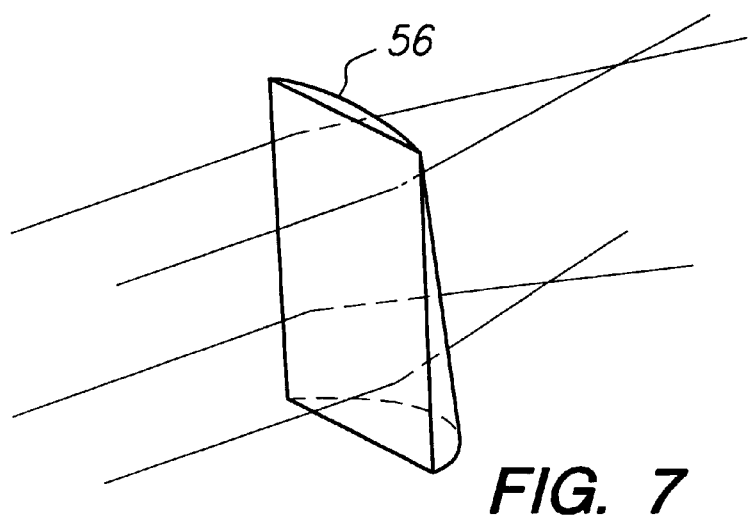
FIG. 7 is an illustrative embodiment of a cylindrical lens for use in an alternative embodiment for correcting magnification errors.

Referring to FIG. 7, a further exemplary embodiment of a variable power optical system is described. Cylindrical lens 56 has a radius of curvature that varies along a length of the lens. Cylindrical lens 56 is positioned in the optical path such that its flat face is perpendicular to the optical path and its axis is perpendicular to the line of the laser diodes.

Like the prisms of the embodiments of FIGS. 6A and 6B, a cylindrical lens provides magnification in only a single dimension, wherein the degree of magnification is determined by the radius of the curved surface of the lens. By using a lens in which the curvature varies along its length, the horizontal magnification of the images may be controlled through vertical movement of the variable radius cylindrical lens. A servo system (not shown) may be used to move the lens vertically in response to the magnification error signal generated by optical sensor 22.

The systems for correcting magnification errors discussed hereinabove operate by changing the magnification or optical power of optical head 10, of FIG. 1. Alternatively, an optical disk reader may compensate for the magnification error by effectively changing the spacing of the laser diodes 12a—12e and, optionally, the spacing of the photodetector elements 34–38, of FIG. 1. An embodiment of such a magnification error compensation system is described with respect to FIGS. 8A and 8B.

Figure 8A:
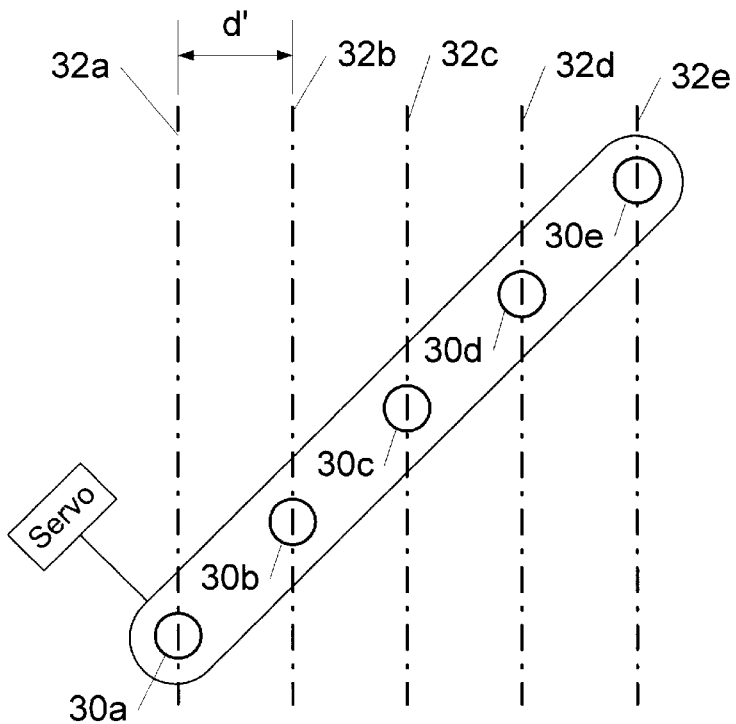
FIGS. 8A–8B illustrate correction of magnification errors by rotating the array of laser diodes that generates the writing beams.
Figure 8B:
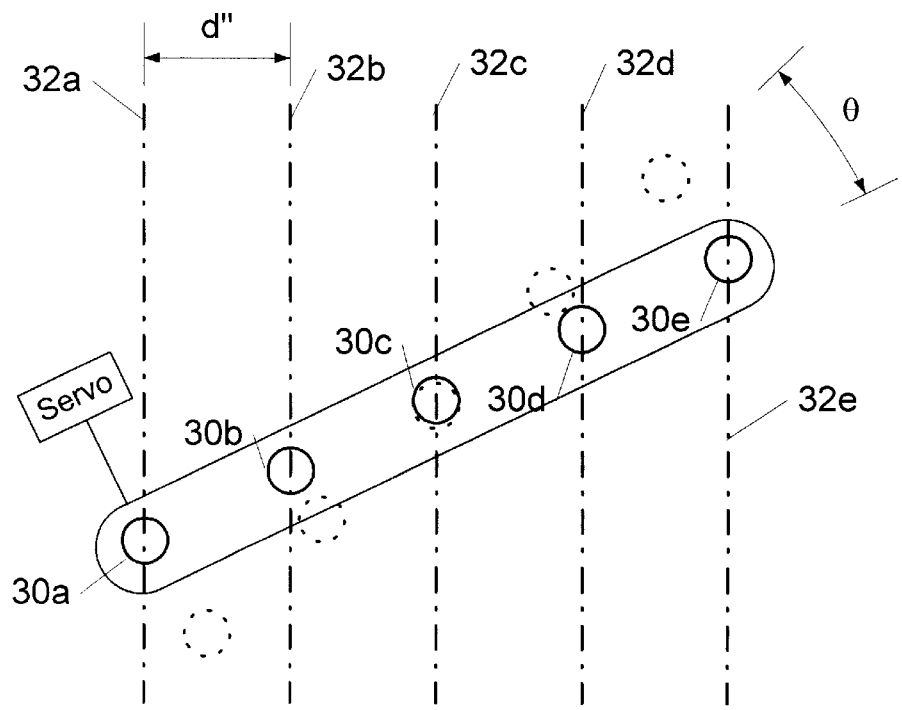

In the embodiment of FIGS. 8A and 8B, laser diodes 12a–12e comprise a rotatable substrate on which the laser-emitting portions are mounted. The substrate may be rotated, or pivoted, to a particular orientation angle responsive to the magnification error signal.

The effective spacing of laser diodes 12a–12e is dependent on the rotation angle θ, and is given by:

$$d' = d \times cos(\theta) \quad (4)$$

where d is the inter-diode spacing, and d' is the effective inter-diode spacing.

For example, in FIG. 8A, laser diodes 12a–12e are oriented at a 45° angle relative to the direction of track image motion, thus the effective inter-diode spacing is equal to $d \cdot cos(45°)$, or about 71% of d. When the magnification error indicates too little magnification, i.e. the spots projected onto optical disk 18 by the beams generated by laser diodes 12a–12e are too closely spaced, a servo system may rotate the array of laser diodes so that they have a larger angle relative to the tracks, as is shown in FIG. 8B. This rotation effectively increases the inter-diode spacing between laser diodes 12a–12e, as shown by d".

Figure 9A:
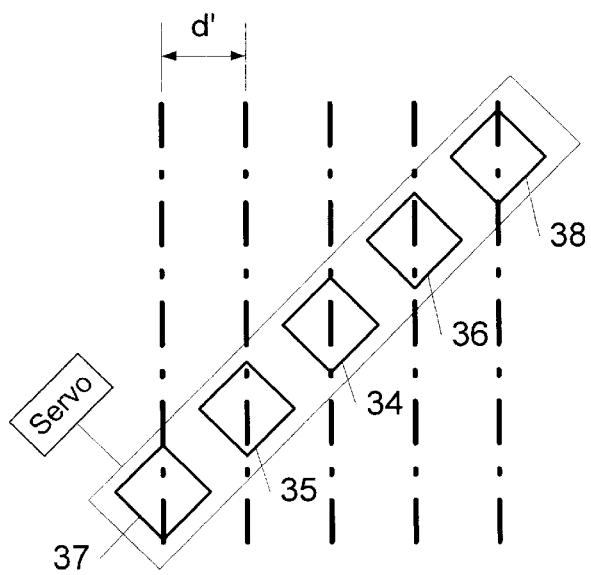
FIGS. 9A–9B illustrate correction of magnification errors by rotating the array of photodetector elements that receives the beams reflected from the surface of the optical disk.

If the above-described magnification error correction techniques are used to correct large errors in the track pitch, it may in addition be necessary to adjust the inter-element spacing of photodetectors 34–38. Specifically, when the beam spacing is adjusted to correct for large variations in track pitch, the beams reflected from the disk may no longer be properly aligned with the sensors. As shown in FIG. 9A, photodetectors 34–38 may be initially oriented at a 45°0 angle relative to the direction of track image motion, in alignment with the laser diodes 12a–12e of FIG. 8A.

Figure 9B:
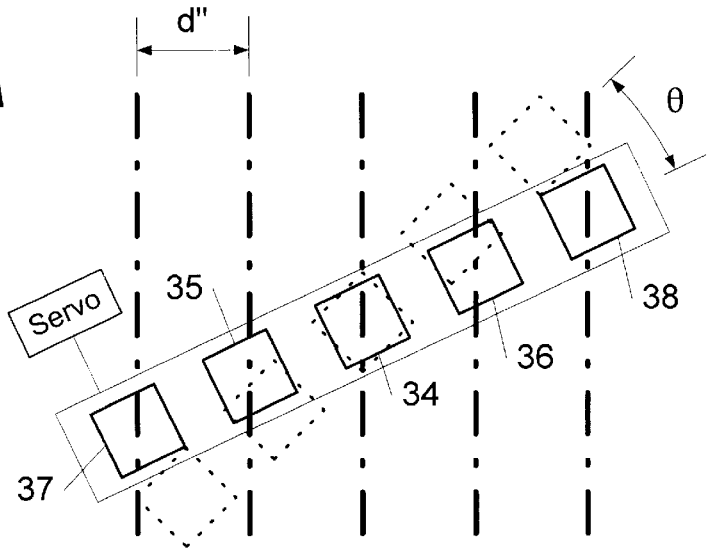

With respect to FIG. 9B, when a magnification error is detected, and the beams are moved closer together by rotating the substrate carrying the laser diodes 12a–12e, and a servo system (not shown) is used to adjust the spacing of the photodetector elements responsive to the beam spacing, for example, by rotating the substrate carrying photodetector elements 34–38. Thus, alignment of the beams generated by the laser diodes and the photodetector elements may be maintained to correct for magnification errors resulting from track pitch variations. The movement of hotodetector elements 34–38 in FIG. 9B is also described by equation (4).

Figure 10:
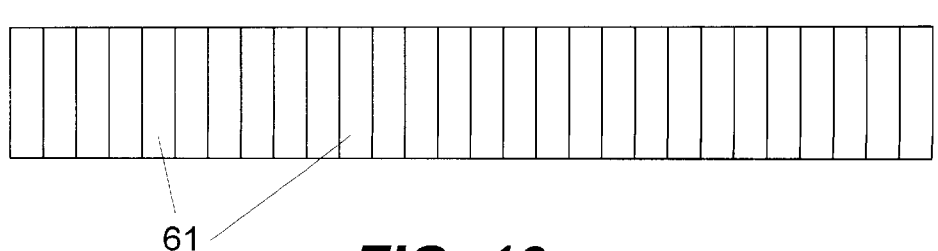
FIG. 10 illustrates an alternative detector suitable for use in the present invention.

With respect to FIG. 10, in an alternative approach to moving photodetector elements 34–38, the individual photodetector elements 34–38 may be replaced by detector 60. Detector 60 preferably includes multiple pixels 61 that are employed to image each track. Track detection methods may be used to determine which of the pixels 61 correspond to the beams reflected from the disk, independent of the beam spacing. Thus, when magnification error correction causes the spacings between beams reflected onto detector 60 to vary, the outputs of pixels 61 may be re-ordered to maintain proper alignment. Electronic track detector apparatus and methods suitable for this purpose are described in commonly assigned U.S. Pat. Nos. 5,701,283, 5,652,746, 5,627,805, and 5,598,393, which are incorporated herein by reference.

One skilled in the art will appreciate that the present invention may be practiced by other than the disclosed embodiments, which are present for purposes of illustration and not of limitation, and that the present invention is limited only by the claims which follow.

What is claimed is:

1. An optical head for simultaneously writing multiple tracks of an optical disk, the optical head comprising:
   a plurality of laser diodes that generate a plurality of writing beams for writing data to corresponding ones of the multiple tracks, whereon the laser diodes are adapted to be individually modulated;
   an optical system disposed in a path of the plurality of writing beams, the optical system directing the plurality of writing beams onto a surface of an optical disk;
   means for detecting a magnification error;
   means for generating a lookup table containing values of magnification error correlated to radial location on the optical disk; and
   means for compensating for the magnification error while writing to the optical disk to align the plurality of writing beams projected onto the surface of the optical disk with the multiple tracks.

2. The optical head of claim 1 wherein the optical system has an adjustable magnification level and the means for compensating adjusts the magnification level of the optical system.

3. The optical head of claim 1 wherein the optical system comprises a plurality of optical components providing an optical path between the plurality of laser diodes and the surface of the optical disk.

4. The optical head of claim 3 wherein the means for compensating for the magnification error while writing to the optical disk comprises a servo for altering a position or orientation of at least one of the plurality of optical components.

5. The optical head of claim 4 wherein the at least one optical-component comprises a lens.

6. The optical head of claim 4 wherein the at least one optical component comprises a prism.

7. The optical head of claim 4 wherein the at least one optical component comprises a cylindrical lens having a radius of curvature that varies along a length of the cylindrical lens.

8. The optical head of claim 1 wherein the means for compensating for the magnification error comprises means for changing an effective spacing between adjacent ones of the plurality of laser diodes.

9. The optical head of claim 8 wherein the means for changing the effective spacing between adjacent ones of the plurality of laser diodes comprises a rotatable substrate on which the laser diodes are mounted, the rotatable substrate being rotated responsive to the magnification error using a servo.

10. The optical head of claim 1 wherein the means for detecting the magnification error comprises a pair of split photodetector elements.

11. The optical head of claim 1 wherein the lookup table is generated by comparing a computed track pitch to a nominal track patch for a specified type of optical disk.

12. The optical head of claim 1 wherein the lookup table is generated by analyzing jitter rates obtained when reading data from the optical disk.

13. A method for simultaneously writing multiple data tracks of an optical disk, the method comprising:
    generating a plurality of writing beams, each writing beam being individually modulated;
    projecting the plurality of writing beams onto a surface of the optical disk;
    detecting a value of a magnification error;
    generating a lookup table containing values of magnification error correlated to radial location on the optical disk; and
    compensating for the magnification error while writing to the optical disk to alien the plurality of writing beams with the multiple data tracks.

14. The method of claim 13 wherein detecting the magnification error comprises:
    projecting beams reflected from the surface of the optical disk onto a plurality of sensors, each of the sensors generating an output signal responsive to the amount of light impinging upon the sensor; and
    arithmetically combining the signals from at least two of the sensors to produce a signal responsive to the value of the magnification error in the plurality of reflected beams projected onto the surface of the optical disk.

15. The method of claim 14 wherein at least one of the sensor elements comprises a plurality of segments, each of the segments providing an output signal, and wherein arithmetically combining the signals from at least two of the sensors comprises combining the output signals of at least some of the segments.

16. The method of claim 13 wherein projecting the plurality of writing beams onto the surface of the optical disk further comprises using a plurality of optical components to direct the plurality of writing beams along an optical path.

17. The method of claim 16 wherein compensating for the magnification error further comprises changing the position or orientation of at least one optical component along the optical path responsive to the value of the magnification error.

18. The method of claim 17 wherein compensating for the magnification error further comprises laterally moving the plurality of writing beams.

19. The method of claim 17 wherein the at least one optical component comprises a lens, and changing the position or orientation of the at least one optical component comprises moving the lens along the optical path.

20. The method of claim 17 wherein the at least one optical component comprises a prism, and changing the position or orientation of the at least one optical component comprises rotating the prism.

21. The method of claim 17 wherein the at least one optical component comprises a cylindrical lens having a radius of curvature that varies along a length of the cylindrical lens, and changing the position or orientation of the at least one optical component comprises longitudinally moving the cylindrical lens.

22. The method of claim 13 wherein compensating for the magnification error comprises changing an effective spacing between adjacent ones of the plurality of writing beams.

23. The method of claim 22 wherein the plurality of writing beams are generated by a plurality of laser diodes which are mounted on a rotatable substrate, and wherein changing the effective spacing between adjacent ones of the plurality of writing beams comprises rotating the rotatable substrate using a servo.

24. The method of claim wherein the lookup table is generated by comparing a computed track pitch to a nominal track pitch for a specified type of optical disk.

25. The method of claim 13 wherein the computed track pitch is determined by dividing a known distance by a number of tracks counted when moving from a first position on the optical disk to a second position on the optical disk.

26. The method of claim 13 wherein the computed track pitch is determined by reading data at first and second positions on the optical disk, and comparing a length of a spiral between the first and second positions to a computed length based upon a nominal track pitch.

27. The method of claim 13 wherein the lookup table is generated by analyzing Pitter rates obtained when reading data from the optical disk.

28. The method of claim 13 wherein compensating for the magnification error comprises determining a radial location on the optical disk and retrieving a corresponding value from the lookup table.

29. The method of claim 13 wherein compensating for the magnification error comprises retrieving a two magnification error values from the lookup table corresponding to two locations on the optical disk, and interpolating to determine the magnification error at another location on the optical disk.

30. The method of claim 13 wherein the lookup table is created when an optical disk is inserted in to an apparatus for reading the optical disk.

* * * * *